United States Patent [19]

Sasajima

[11] Patent Number: 5,343,336
[45] Date of Patent: Aug. 30, 1994

[54] MAGNETIC RECORDING REPRODUCING APPARATUS WITH TIME CODE RECORDING

[75] Inventor: Yasutaka Sasajima, Yokosuka, Japan

[73] Assignee: Victor Company of Japan, Ltd., Yokohama, Japan

[21] Appl. No.: 989,312

[22] Filed: Dec. 11, 1992

[30] Foreign Application Priority Data

Dec. 13, 1991 [JP] Japan .................... 3-352471

[51] Int. Cl.$^5$ .................... G11B 5/02; G11B 27/02
[52] U.S. Cl. .................... 360/55; 360/14.1; 360/14.3
[58] Field of Search .................... 360/7, 13–14.3, 360/37.1, 51, 55, 62, 77.02, 72.02; 358/320, 311, 325, 335, 310, 337

[56] References Cited

U.S. PATENT DOCUMENTS

| | | | |
|---|---|---|---|
| 4,134,130 | 1/1979 | Tachi | 360/14.3 X |
| 4,167,759 | 9/1979 | Tachi | 360/14.3 |
| 4,706,135 | 11/1987 | Kojima | 360/14.1 |
| 4,766,506 | 8/1988 | Yagi et al. | 360/37.1 |
| 5,012,356 | 4/1991 | Kosaka | 360/61 |
| 5,173,812 | 12/1992 | Reime | 360/14.1 |
| 5,177,619 | 8/1993 | Sato | 360/14.1 X |

FOREIGN PATENT DOCUMENTS

| | | | |
|---|---|---|---|
| 0455874 | 11/1991 | European Pat. Off. | 360/31 |
| 3925628 | 2/1991 | Fed. Rep. of Germany | 360/77.01 |
| 60-201532 | 10/1985 | Japan | 360/77.01 |
| 1-211294 | 8/1989 | Japan | 360/31 |

Primary Examiner—Donald Hajec
Assistant Examiner—Thien Minh Le
Attorney, Agent, or Firm—Lowe, Price, LeBlanc & Becker

[57] ABSTRACT

A first apparatus for recording/reproducing a video signal on/from a magnetic tape has a delay for delaying a composite sync (synchronizing) signal obtained from a reproduced video signal; a signal adding circuit for adding a VITC (vertical interval time code) signal to the delayed composite sync signal; a switch circuit for switching the mode of the apparatus between recording and reproducing modes; and a timing circuit. The composite sync signal is delayed by the delay, then the VITC signal is added thereto. The VITC-added composite sync signal is recorded for a predetermined horizontal scanning line(s) by switching the switch circuit. The delay is provided to maintain reception of the composite sync signal during the recording mode and to compensate delay in the loop from the reproducing circuitry to a circuitry for recording the VITC-added composite signal. Thus, the VITC signal can be written or rewritten over the recorded magnetic tape. A second apparatus also can overwrite the VITC signal by generation of a quasi-composite signal from the reproduced composite sync signal, having lead to the reproduced composite sync signal to compensate the circuit delay.

7 Claims, 10 Drawing Sheets

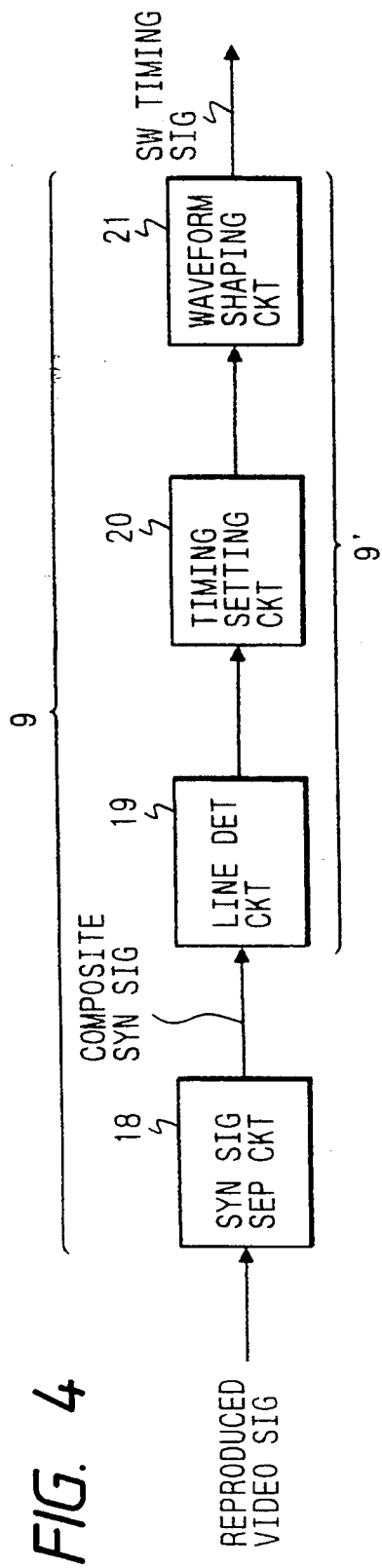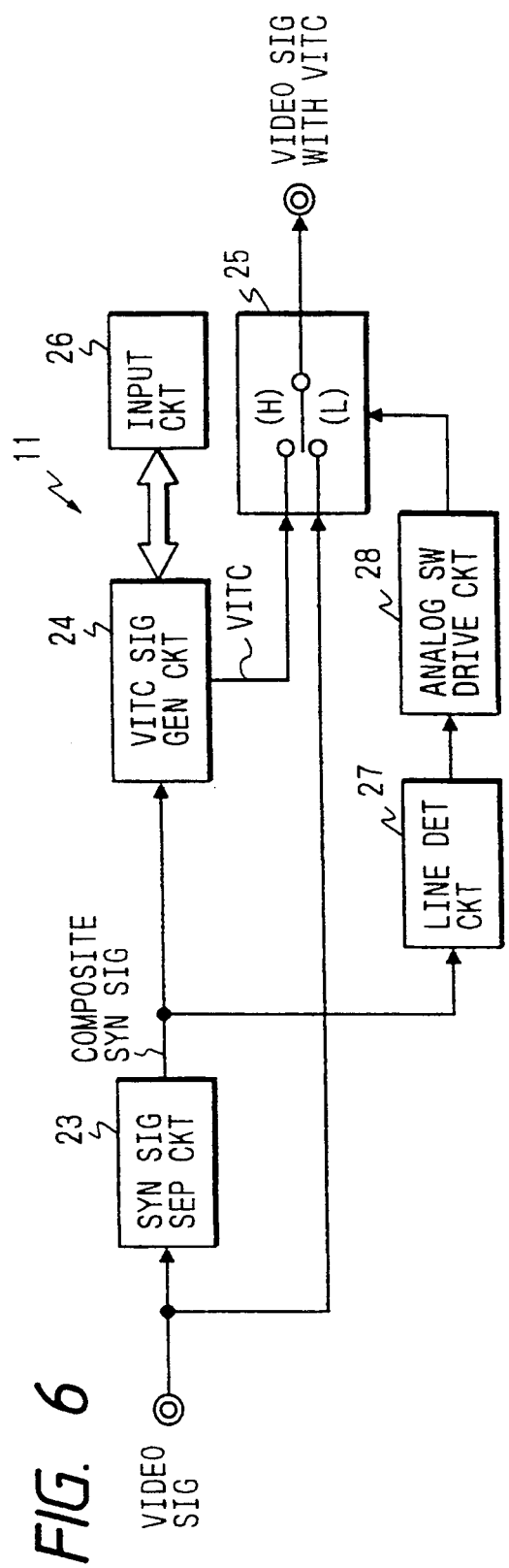
FIG. 4
FIG. 6

MAGNETIC RECORDING REPRODUCING APPARATUS WITH TIME CODE RECORDING

BACKGROUND OF THE INVENTION

1. Field of the Invention

This invention relates to a magnetic recording/reproducing apparatus and particularly to a magnetic recording/reproducing apparatus with time code recording.

2. Description of the Prior Art

A magnetic recording/reproducing apparatus with time code recording is known. Such a magnetic recording/reproducing apparatus, which is known as a VTR with a time code function, can record a video signal and a time code on a magnetic tape. The time code is used for editing a magnetic tape. A time code recorded in a vertical blanking period of a video signal is referred to as VITC (Vertical Interval Time Code). The VITC signal has information of 90 bits and is generally recorded on the twelfth and fourteenth lines within the vertical blanking period.

Hereinbelow will be described techniques of addition or rewriting of the time code on a magnetic tape on which a video signal has been recorded.

FIG. 13 is a block diagram of a system for addition or rewriting of the VITC signal of a prior art. In FIG. 13, a VTR (player) 4 reproduces a video signal which is sent to a VITC signal generator 2. The VITC signal generator 2 adds the VITC signal to the reproduced video signal and sends it to the other VTR (recorder) 3 for recording the reproduced video signal with VITC signal. Therefore, the video signal reproduced by the VTR (player) 4 is recorded with VITC signal by the VTR (recorder) 3.

FIG. 14 is a block diagram of another system for addition or rewriting of the VITC signal of a prior art. In FIG. 14, the VTR (player) 4 reproduces the video signal which is sent to a VTR (recorder) 5 for recording with a VITC signal recording function. The VTR 5 adds the VITC signal to the reproduced video signal and record the reproduced video signal with VITC signal on a magnetic tape.

However, there is a problem that a picture quality is decreased by duplication between the VTRs 4 and 3 or between the VTRs 4 and 5. Therefore, it is essentially impossible to rewrite the information included in the VITC signal several times because of the decrease in the picture quality.

SUMMARY OF THE INVENTION

The present invention has been developed in order to remove the above-described drawbacks inherent to the conventional magnetic recording/reproducing apparatus with time code recording.

According to the present invention there is provided a magnetic recording/reproducing apparatus comprising, a magnetic head circuit for reproducing a video signal including vertical and horizontal synchronizing signals, recorded on a magnetic tape, in reproducing mode or writing an information-signal-added horizontal synchronizing signal on the magnetic tape in a recording mode; a synchronizing signal separation circuit for separating horizontal synchronizing signal from the reproduced video signal; a vertical synchronizing signal detection circuit for detecting the vertical synchronizing signal from the reproduced video signal; a timing signal generation circuit responsive to the vertical signal for generating a timing signal indicative of a predetermined interval with a predetermined delay from the detected vertical synchronizing signal; a switching circuit responsive to the timing signal for switching the mode of the magnetic head circuit from the reproducing mode to the recording mode; and a signal generation circuit responsive to the detected vertical synchronizing signal, the separated horizontal synchronizing signal, and a command signal, having: a delay circuit; an information signal generation circuit for generating an information signal in response to the command signal; and a signal adding circuit for adding the information signal to the separated information signal, wherein the signal generation circuit outputs the information-signal-added horizontal synchronizing signal in the predetermined interval using the delay circuit.

According to the present invention there is also provided a magnetic recording/reproducing apparatus comprising, a magnetic head circuit for reproducing a video signal including vertical and horizontal synchronizing signals, recorded on a magnetic tape, in a reproducing mode or writing a signal-added horizontal synchronizing signal on the magnetic tape in a recording mode; a synchronizing signal separation circuit for separating horizontal synchronizing signal from the reproduced video signal; a vertical synchronizing signal detection circuit for detecting the vertical synchronizing signal from the reproduced video signal; a timing signal generation circuit responsive to the vertical signal for generating a timing signal indicative of a predetermined interval with a predetermined delay from the detected vertical synchronizing signal; a switching circuit responsive to the timing signal for switching the mode of the magnetic head circuit to the recording mode from the reproducing mode; a quasi-horizontal synchronizing signal generation circuit responsive to the vertical synchronizing signal for generating a quasi-horizontal synchronizing signal; an information signal generation circuit responsive to a command signal for generating an information signal; and a signal adding circuit responsive to the timing signal for adding the information signal to the quasi-horizontal synchronizing signal to produce the signal-added horizontal synchronizing signal, wherein the quasi-horizontal synchronizing signal generation circuit generates the quasi-horizontal synchronizing signal with lead to the separated horizontal synchronizing signal such that the quasi-horizontal synchronizing signal recorded in the predetermined interval in phase with the reproduced horizontal synchronizing signal.

BRIEF DESCRIPTION OF THE DRAWINGS

The object and features of the present invention will become more readily apparent from the following detailed description taken in conjunction with the accompanying drawings in which:

FIG. 4 is a block diagram of the switching timing signal generation circuit of the first and second embodiments;

FIG. 6 is a block diagram of VITC signal adding circuit of the first and second embodiments;

The same or corresponding elements or parts are designated as like references throughout the drawings.

DETAILED DESCRIPTION OF THE INVENTION

Hereinbelow will be described a first embodiment of this invention with reference to drawings.

Figure 1:
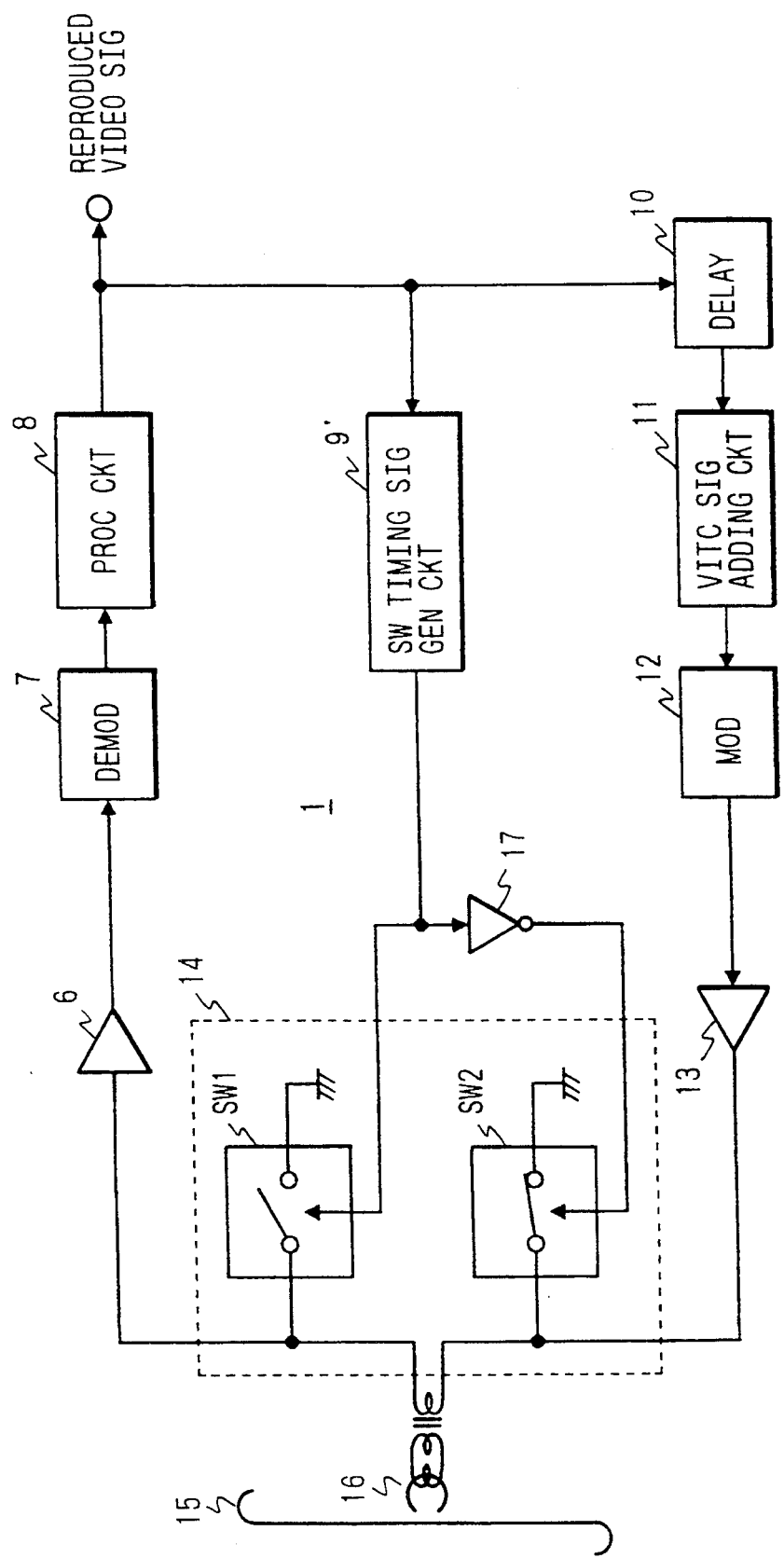
FIG. 1 is a block diagram of a first embodiment of a magnetic recording/reproducing apparatus with time code recording.

FIG. 1 is a block diagram of the first embodiment of a magnetic recording/reproducing apparatus with time code recording. The magnetic recording/reproducing apparatus with time code recording of the first embodiment comprises a magnetic head 16 for reproducing a recorded video signal out from a magnetic tape 15 and for recording; a preamplifier 6 for amplifying the reproduced modulated video signal; a demodulator 7 for demodulating the reproduced modulated video signal; a processing circuit 8 for processing the demodulated video signal to output a reproduced video signal and send the reproduced video signal to a delay circuit 10; the delay circuit 10 for delaying the reproduced video signal for a given interval; a VITC signal adding circuit 11 for adding a VITC signal to the delayed video signal; a modulator 12 for modulating the video signal to which the VITC signal is added; a recording amplifier 13 for amplifying the modulated video signal for driving the magnetic head 16 to record the video signal; a switching circuit 14 having a first switch Sw1 for grounding one terminal of the magnetic head 16 and a second switch Sw2 for grounding the other terminal of the magnetic head 16; and a switching timing signal generator 9 for generating a switching timing signal in response to vertical and horizontal synchronizing signals included in the reproduced video signal from the processing circuit 8. The first switch Sw1 grounds the first terminal of the magnetic head 16 when the VITC signal is to be recorded over the recorded video signal. The second switch Sw2 grounds the second terminal of the magnetic head 16 when the VITC signal is not to be recorded over the recorded video signal because the switching timing signal is supplied to the switch Sw2 through an inverter 17. The same as a general VTR, the magnetic tape 15 is helically lapped around the rotating magnetic (video) head 16, and video tracks on the magnetic tape 15 are slantwise scanned by the magnetic (video) head 16.

Hereinbelow will be described operation of the magnetic recording/reproducing apparatus of the first embodiment.

The magnetic tape 15 where the video signal is recorded is set and the magnetic recording/reproducing apparatus is operated. If the VITC signal is recorded on the magnetic tape 15, it is renewed. If the VITC signal has not been recorded on the magnetic tape 15, it is added to the recorded video signal without copying of the video signal.

In reproduce mode, that is, when the switch Sw2 is closed and the switch Sw1 is made open, the magnetic head 16 reproduces the recorded video signal from the magnetic tape 15. The preamplifier 6 amplifies the reproduced modulated video signal. The demodulator 7 demodulates the amplified video signal. The processing circuit 8 processes the reproduced demodulated video signal to output a reproduced video signal and sends the reproduced video signal to a delay circuit 10. The delay circuit 10 delays the reproduced video signal for a given interval, for example, 1H minus 4 $\mu$s, to adjust timings between the reproduced video signal and the VITC signal. In the case that the mode is switched to the recording mode from eleventh to fourteenth lines 11H–14H, the delay time is set to be 4H minus 4 $\mu$s. The interval of 4H is provided because the composite synchronizing signal cannot be obtained from the reproduced video signal for that interval. The "minus 4 $\mu$s" is provided to compensate delay of the circuitry of circuits 16, 6, 7, 8, 10, 11, 12, 13, and 16. The VITC signal adding circuit 11 adds the VITC signal to the delayed video signal. The modulator 12 modulates the video signal to which the VITC signal is added. The recording amplifier 13 amplifies the modulated video signal to drive the magnetic head 16 to record the video signal. The first switch Sw1 grounds one terminal of the magnetic head 16 in response to the switching timing signal when the switching timing signal indicates the reproducing mode. The second switch Sw2 grounds the other terminal of the magnetic head 16 in response to the switching timing signal when the switching timing signal indicates the reproducing mode. The switching timing signal generator circuit 9 generates the switching timing signal in response to vertical and horizontal synchronizing signals included in the reproduced video signal from the processing circuit 8 to detect desired horizontal scanning interval(s) for recording the VITC signal. The first switch Sw1 grounds the first terminal of the magnetic head 16 when the VITC signal is to be recorded over the recorded video signal. The second switch Sw2 grounds the second terminal of the magnetic head 16 when the VITC signal is not to be recorded over the recorded video signal because the switching timing signal is supplied to the switch Sw2 through an inverter 17.

Figure 5:
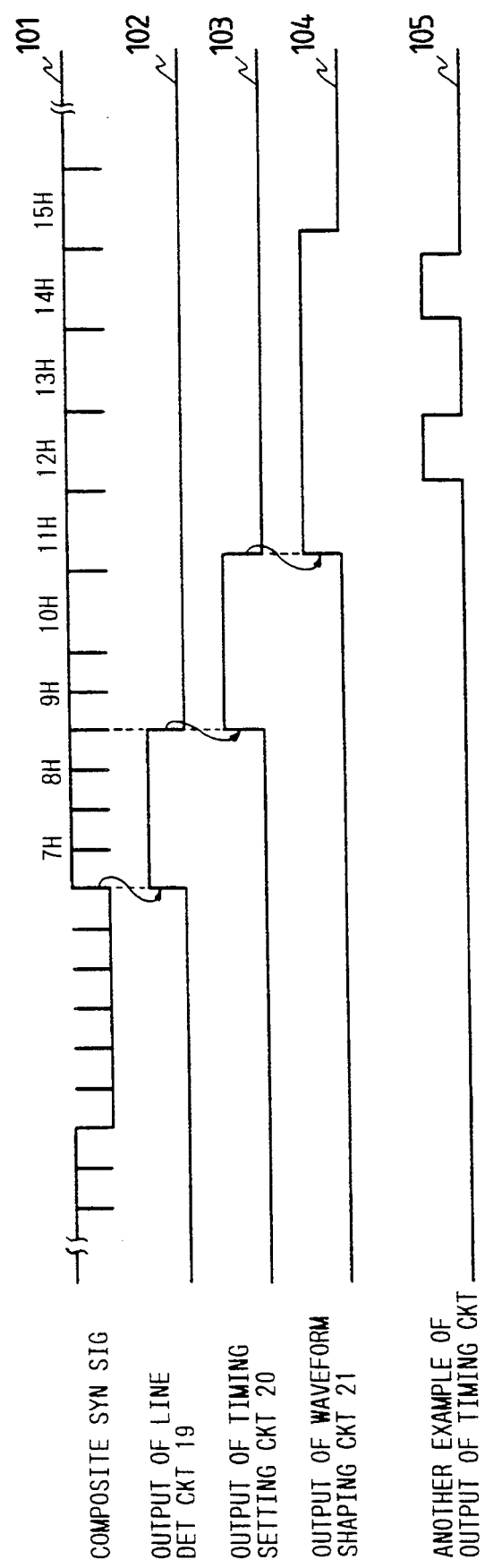
FIG. 5 shows waveforms of respective portion of the switching timing signal generation circuit of the first embodiment.

FIG. 4 is a block diagram of the switching timing signal generation circuit. FIG. 5 shows waveforms of respective portions of the switching timing signal generator circuit 9. The switching signal generator circuit 9 comprises: a synchronizing signal separation circuit 18 for separating a composite synchronizing signal from the reproduced video signal; a line detection circuit 19 for detecting a predetermined horizontal scanning line, for example ninth horizontal scanning line 9H; a timing setting circuit 20 for delaying an output of the line number detection circuit 19 for obtaining a timing of a predetermined horizontal scanning line, for example, eleventh line 11H; a waveform shaping circuit 21 for generating a timing signal indicative of an interval from eleventh to fourteenth lines 11H-14H.

In FIG. 5, waveform 101 shows the composite synchronizing signal outputted from the synchronizing signal separation circuit 18 where the vertical synchronizing signal is not shown. Waveform 102 shows an output of the line number detection circuit 19. Waveform 103 shows an output of the timing setting circuit 20. Waveform 104 shows the switching timing signal of the waveform shaping circuit 21.

The switching timing signal generator circuit 9 generates the switching timing signal to cause the switching circuit 14 to switch over between the recording and reproducing modes instantaneously. That is, the magnetic head 16 records the VITC signal from the record amplifier 13 for only horizontal scanning lines 11H to 14H as shown by the waveform 104. Waveform 105 shows another example of the switching timing signal. In such an example, the magnetic recording/reproducing apparatus records the VITC signal for only horizontal scanning lines 12H and 14H.

The switching timing signal is generated as follows:

The synchronizing signal separation circuit 18 separates the composite synchronizing signal from the reproduced video signal. The line detection circuit 19 detects the horizontal scanning line 9H in response to the composite synchronizing signal as shown by the waveform 101. That is, the line detection circuit 19 detects the vertical synchronizing pulse and in response to this, it starts counting of the horizontal synchronizing pulses. When the count value agrees with the predetermined line, for example nine, it generates an output as shown by the waveform 102.

Figure 12:
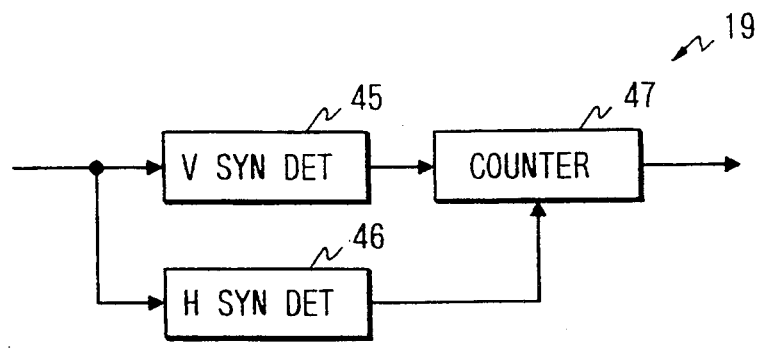
FIG. 12 is a block diagram of a line detection circuit of the first and second embodiments.
Figure 13:
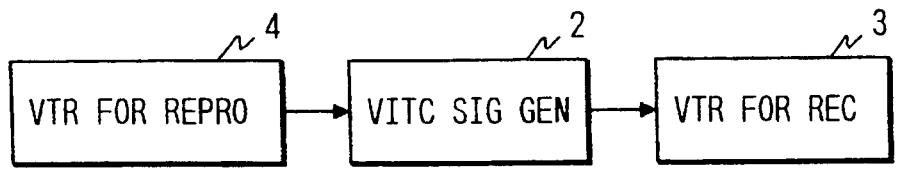
FIGS. 13 and 14 are system block diagrams of magnetic recording/reproducing apparatus with time code recording.
Figure 14:
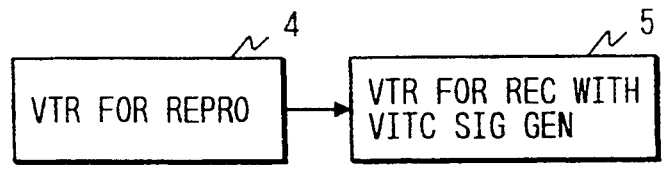

FIG. 12 is a block diagram of the line detection circuit 19 which is also used in the second embodiment. The line detection circuit 19 comprises a vertical synchronizing signal detector 45 responsive to the composite synchronizing signal for detecting a vertical synchronizing signal, a horizontal synchronizing detector 46, and a counter 44 for counting the horizontal synchronizing signals after detection of the vertical synchronizing signal to detect a specific horizontal line.

The timing setting circuit 20 detects the start timing of the eleventh horizontal line 11H in response to an output of the line detection circuit 19 and generates an output as shown by the waveform 103. The waveform shaping circuit 21 outputs the switching timing signal, as shown by the waveform 104 (or 105), in response to an output of the timing setting circuit 20. The switching circuit 14 switches the mode of the magnetic recording/reproducing apparatus from reproducing to recording modes in response to the switching timing signal for the interval from eleventh to fourteenth horizontal scanning lines 11H to 14H.

Figure 2:
FIG. 2 shows a waveform of a reproduced video signal from the video tape on which the VITC signal is overwritten by the magnetic recording/reproducing apparatus of the first and second embodiments.

FIG. 2 shows a waveform of reproduced video signal from the video tape 15 on which the VITC signal is overwritten by the magnetic recording/reproducing apparatus of the first embodiment.

Figure 3:
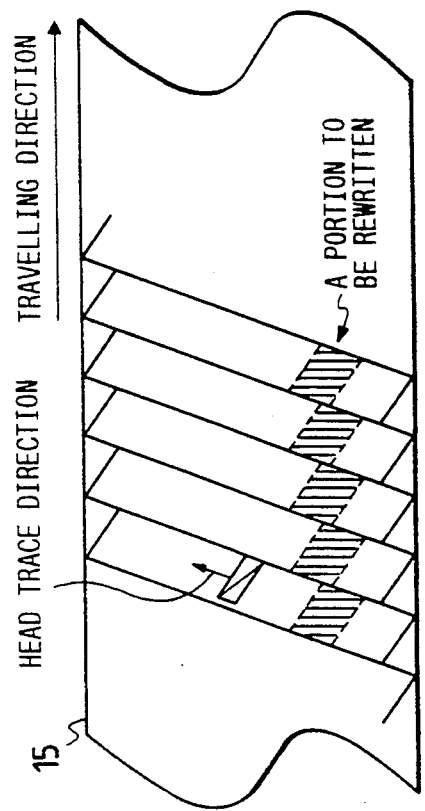
FIG. 3 shows an illustration for showing a portion of the magnetic tape to be rewritten through overwriting by the magnetic recording/reproducing apparatus of the first and second embodiments.

FIG. 3 shows an illustration for showing a portion of the magnetic tape 15 to be rewritten through overwriting by the magnetic recording/reproducing apparatus of the first embodiment wherein the magnetic tape is slantwise scanned by the magnetic head 16.

FIG. 6 is a block diagram of the VITC signal adding circuit 11. The VITC signal adding circuit 11 comprises a synchronizing signal separation circuit 23 for separating a composite synchronizing signal from an output of the delay circuit 10; a VITC signal generation circuit 24 for generating the VITC signal in response to the synchronizing signal from the synchronizing signal separation circuit 23 and a VITC signal setting signal; an input circuit 26 for generating the VITC signal setting signal indicative of a desired value in response to manual operation for generating a predetermined value; an analog switching circuit 25 for transferring either of an output of the VITC signal generation circuit 24 or the delayed video signal from the delay circuit 10 in response to a switching control signal; a line detection circuit 27 for detecting twelfth and fourteenth lines in response to the composite synchronizing signal from the synchronizing signal separation circuit 23; and an analog switch drive circuit 28 for generating the switching control signal to drive the analog switch circuit 25. The VITC signal generation circuit 24 is formed in an integrated circuit. For example, an IC of model number MB 654225 manufactured by FUJITSU LIMITED is available.

Figure 7:
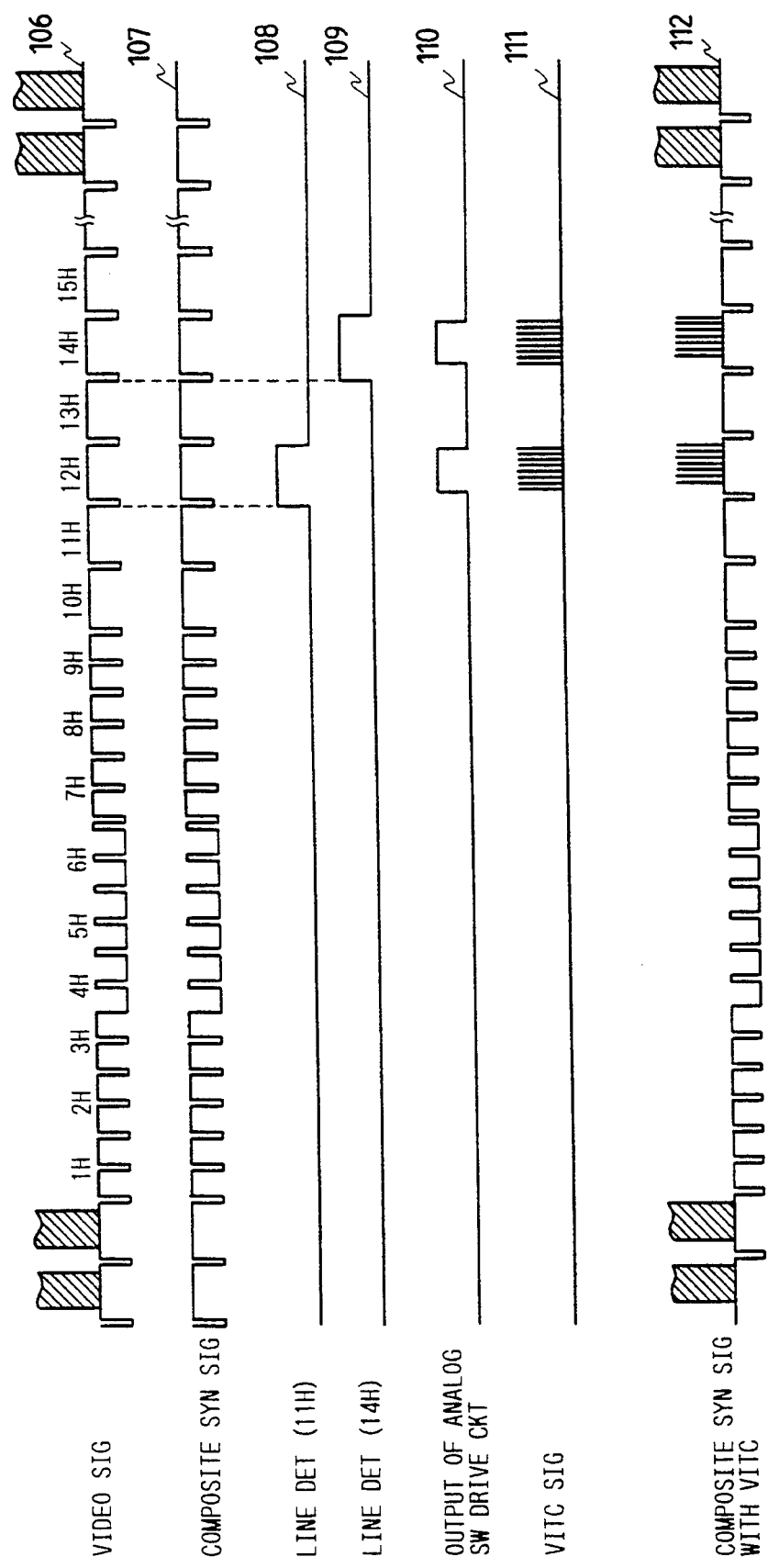
FIG. 7 shows a time chart for describing the operation of the VITC signal adding circuit of the first and second embodiments.

FIG. 7 shows a time chart for describing the operation of the VITC signal adding circuit 11. Waveform 106 shows a video signal inputted therein, that is, the delayed reproduced video signal from the delay circuit 10. Waveform 107 is the composite synchronizing signal. Waveforms 108 and 109 are outputs of the line detection of the eleventh and fourteenth horizontal lines 11H and 14H. Waveform 110 is an output of the analog switch drive circuit 28. Waveform 111 is the VITC signal from the VITC signal generation circuit 24. Waveform 112 is the delayed reproduced video signal to which the VITC signal is added.

The synchronizing signal separation circuit 23 separates the composite synchronizing signal from the output of the delay circuit 10 as shown by the waveform 106. The VITC signal generation circuit 24 generates the VITC signal in response to the synchronizing signal from the synchronizing signal separation circuit 23 and a VITC signal setting signal as shown by waveform 111. The input circuit 26 generates the VITC signal setting signal indicative of a desired VITC in response to manual operation or generates the predetermined value. For example, an operator inputs a desired initial VITC value to the VITC signal generation circuit 24. The VITC signal generation circuit 24 increases the value of the VITC signal with passing of time. The analog switching circuit 25 transfers either of an output of the VITC signal generation circuit or the delayed video signal from the delay circuit 10 in response to the switching control signal. The line detection circuit 27 detects twelfth and fourteenth lines in response to the composite synchronizing signal from the synchronizing signal separation circuit 23 as shown by waveforms 108 and 109. The analog switch drive circuit 28 generates the switching control signal to drive the analog switch circuit 25 as shown by waveform 110. The analog switching circuit 25 outputs the delayed reproduced video signal from the delay circuit 10 when the output of the analog switch drive circuit 28 is logic L and outputs the VITC signal when the output of the analog switch drive circuit 28 is logic H.

In this embodiment, the circuit configuration can be modified, for example, the location of the delay circuit 10 is replaced with that of the VITC signal adding circuit 11. The point of this embodiment is to adjust the time difference between the reproduced video signal and video signal written over the video signal recorded on the magnetic tape by the delay circuit 10. That is, the delay circuit 10 delays the reproduced video signal or the output of the VITC signal adding circuit 11 such that the vertical and horizontal synchronizing signals of the recorded video signal on the magnetic tape 15 agree with timings of horizontal synchronizing signal including the VITC signal to be overwritten. Moreover, in this embodiment, the input signal of the switching timing signal generation circuit is the reproduced video signal. However, a synchronizing signal obtained through an ordinal video signal processing or another signal in phase with the reproduced video signal obtained from the VITC signal adding circuit 11 can be used. Further, in this embodiment, the VITC signal is added. However, a signal other than the time code can be added to the video signal. In this embodiment, it is preferred that a deemphasis circuit (not shown) is provided before the demodulator 7 and a preemphasis circuit is provided before the modulator 12.

Hereinbelow will be described a second embodiment of this invention.

Figure 8:
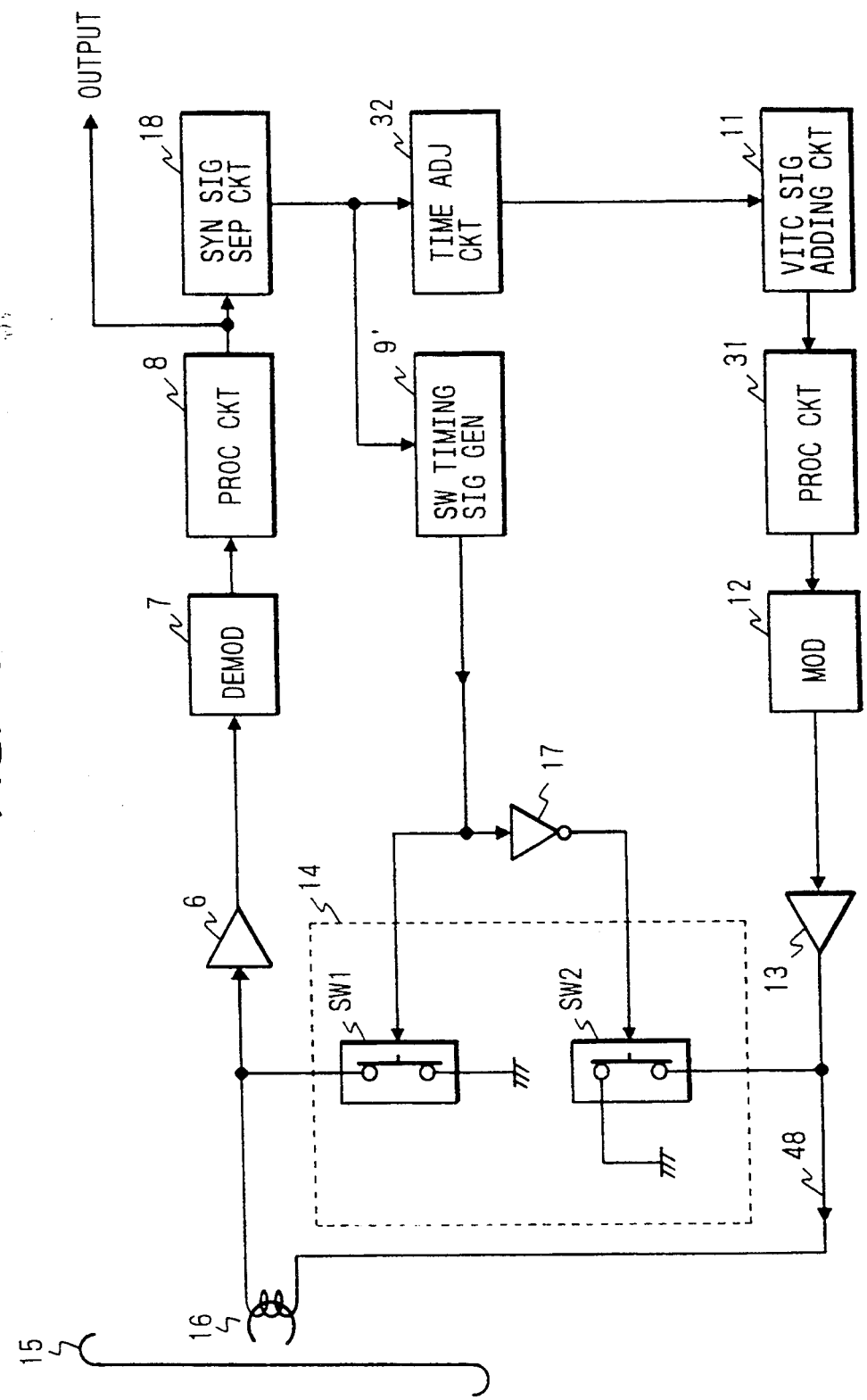
FIG. 8 is a block diagram of a second embodiment of a magnetic recording/reproducing apparatus with time code recording.

FIG. 8 is a block diagram of the second embodiment of a magnetic recording/reproducing apparatus with time code recording. The magnetic recording/reproducing apparatus with time code recording of the second embodiment comprises a magnetic head 16 for reproducing a recorded video signal from a magnetic tape 15 and for recording; a preamplifier 6 for amplifying the reproduced video signal; a demodulator 7 for demodulating the reproduced modulated video signal; a processing circuit 8 for processing the demodulated video signal to output a reproduced video signal and sending the reproduced video signal to a synchronizing separation circuit 18 for separating a composite synchronizing signal from an output of the processing circuit 8; a time adjusting circuit 32 for generating a time-adjusted composite synchronizing signal in response to the composite synchronizing signal from the synchronizing separation circuit 18; a VITC signal adding circuit 11 for adding a VITC signal to the composite synchronizing signal; a processing circuit 31 for processing an output of the VITC signal adding circuit 11; a modulator 12 for modulating the video signal to which the VITC signal is added; a recording amplifier 13 for amplifying the modulated video signal 12 for driving the magnetic head 16 to record the video signal; a switching circuit 14 having a first switch Sw1 for grounding one terminal of the magnetic head 16 and a second switch Sw2 for grounding the other terminal of the magnetic head 16; and a switching timing signal generator 9' for generating a switching timing signal in response to the composite synchronizing signal from the synchronizing separation circuit 18. The first switch Sw1 grounds the first terminal of the magnetic head 16 when the VITC signal is to be recorded over the recorded video signal. The second switch Sw2 grounds the second terminal of the magnetic head 16 when the VITC signal is not to be recorded over the recorded video signal because the switching timing signal is supplied to the switch Sw2 through an inverter 17.

Hereinbelow will be described operation of the magnetic recording/reproducing apparatus of the second embodiment.

In the reproducing mode, that is, when the switch Sw2 is closed and the switch Sw1 is made open, the magnetic head 16 reproduces the recorded video signal from the magnetic tape 15. The preamplifier 6 amplifies the reproduced modulated video signal. The demodulator 7 demodulates the amplified modulated video signal.

The processing circuit 8 processes the demodulated video signal to output a reproduced video signal and sends the reproduced video signal to the synchronizing signal separation circuit 18. The synchronizing signal separation circuit 18 separates the composite synchronizing signal from the reproduced video signal. The time adjusting circuit 32 generates a quasi-composite synchronizing signal from the composite synchronizing signal from the synchronizing signal separation circuit 18 and replaces the composite synchronizing signal with the quasi-composite synchronizing signal for the interval from the horizontal scanning lines 11H to 15H. The quasi-composite synchronizing signal leads the composite synchronizing signal from the composite signal separation circuit 18 about 4 $\mu$s to compensate the delay of the loop circuitry from the magnetic head 16, via the synchronizing signal separation circuit 18 and the VITC signal adding circuit to the magnetic head 16. That is, the time-adjusted signal from the time adjusting circuit 32 adjusts the difference of timings between the reproduced video signal and the VITC signal. The VITC signal adding circuit 11 adds the VITC signal to the time-adjusted composite signal as described in the first embodiment. The processing circuit 31 processes an output of the VITC signal adding circuit 11. The modulation circuit 12 modulates an output of the processing circuit 31. The recording amplifier 13 amplifies an output of the modulation circuit 12. The switching timing signal generator circuit 9' comprises the line detection circuit 19, the timing setting circuit 20, and waveform shaping circuit 21 as shown in FIG. 4. That is, the switching timing signal generator circuit 9' is obtained by removing the synchronizing signal separation circuit 18 from the switching timing signal generator circuit 9 because the synchronizing signal separation circuit 18 is located before the switching timing signal generator circuit 9' as shown in FIG. 8. The operation of the switching timing signal generator circuit 9' is the same as that of the first embodiment. Thus, the detailed description is omitted.

Figure 9:
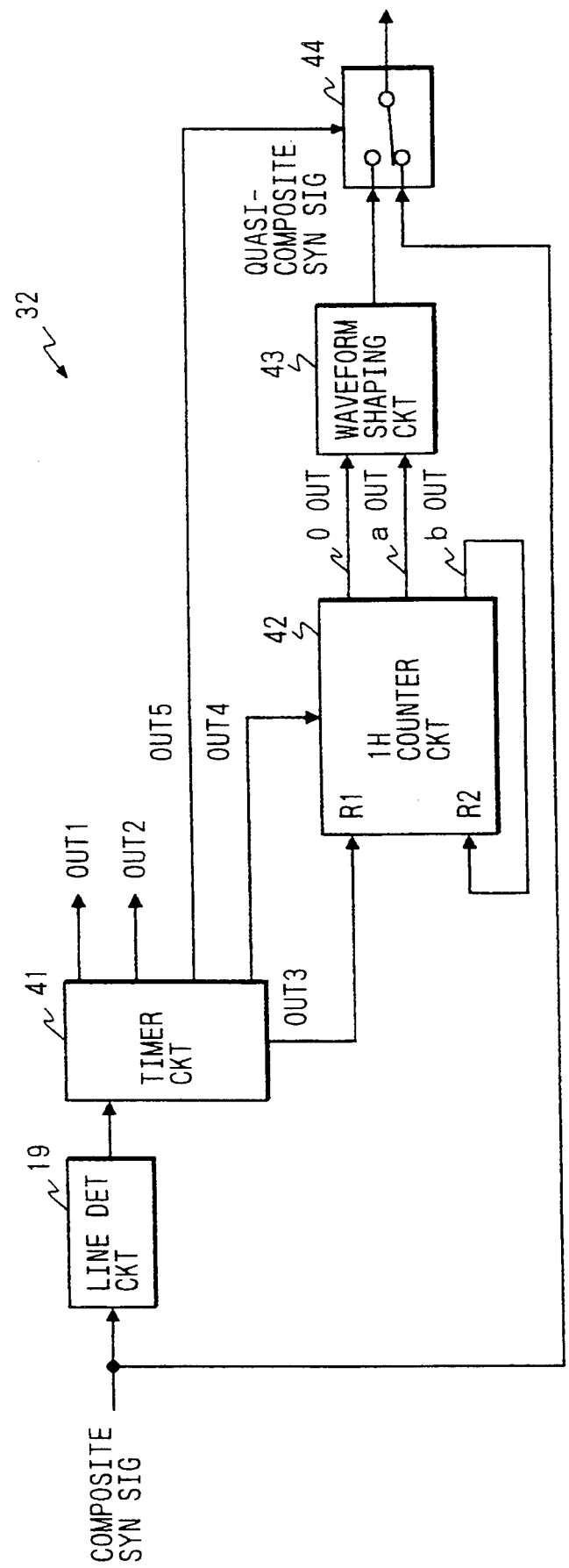
FIG. 9 is a block diagram of the time adjust circuit shown in FIG. 8.
Figure 10:
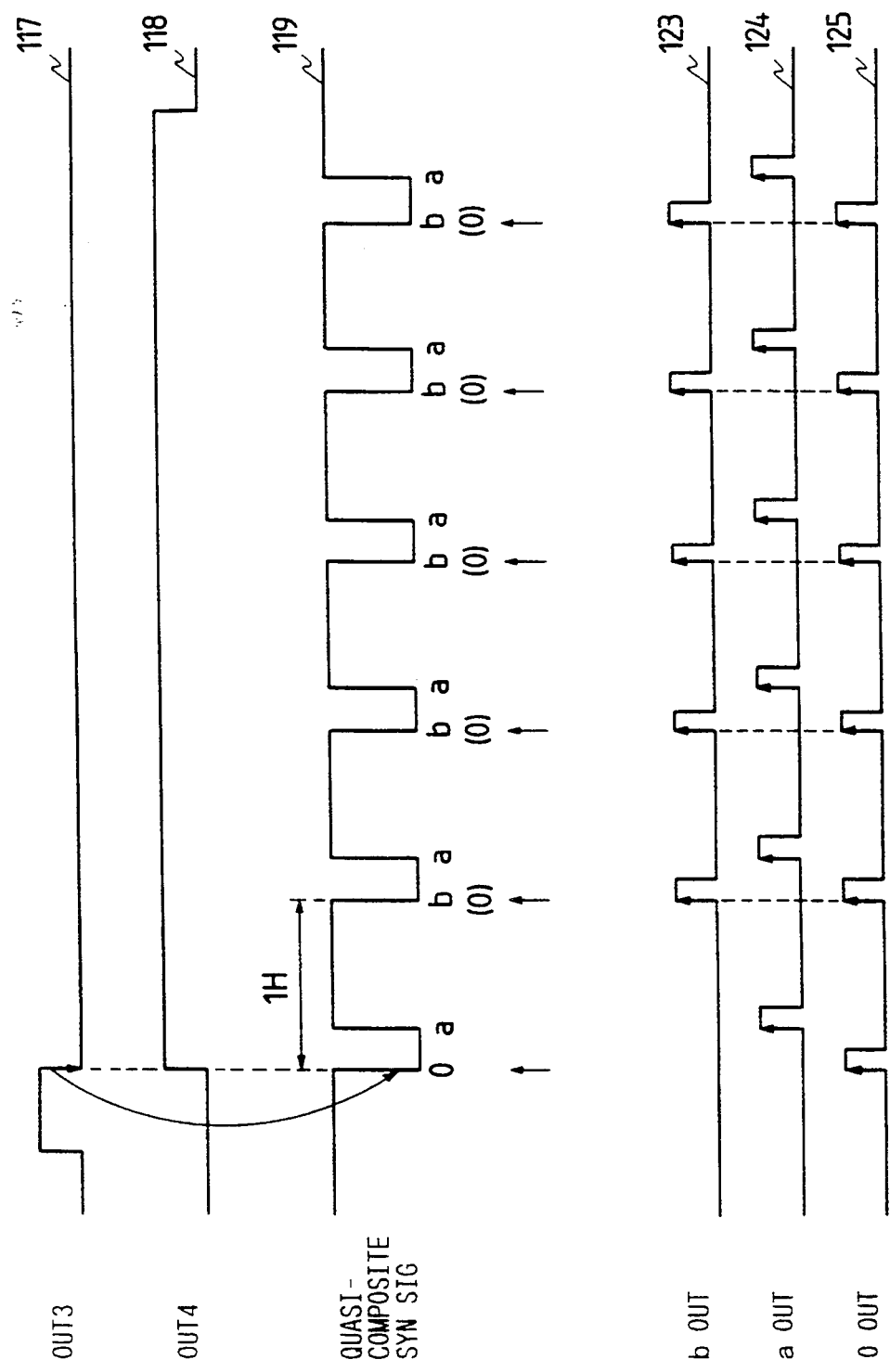
FIG. 10 shows waveforms of respect outputs of the time adjust circuit of the second embodiment.
Figure 11:
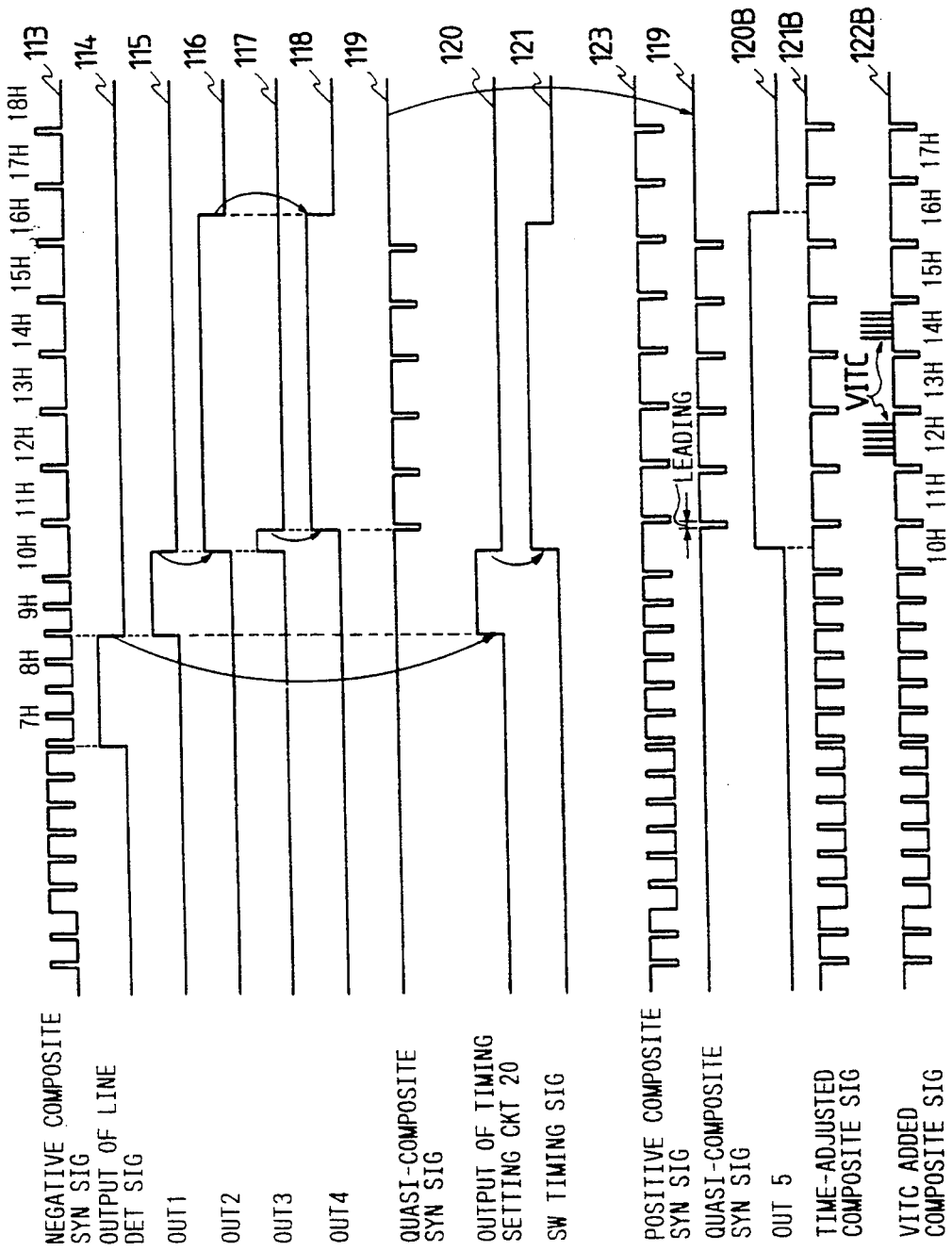
FIG. 11 shows waveforms of respect portions shown in FIGS. 8 and 9.

FIG. 9 is a block diagram of the time adjusting circuit 32 shown in FIG. 8. FIG. 10 shows waveforms of respective outputs of the time adjusting circuit 32. FIG. 11 shows waveforms of respective portions shown in FIGS. 8 and 9.

The time adjusting circuit 32 comprises a line detection circuit 19 for detecting a predetermined horizontal scanning line, for example, the ninth horizontal line H9, a timer circuit 41 for generating timing signals and outputs them at outputs OUT1 to OUT5 as shown in FIG. 11, a one-H counter circuit 42 for generating outputs signals OOUT, aOUT, and bOUT shown by waveforms 123–125 in FIG. 10, a waveform shaping circuit 43 for generating the quasi-composite synchronizing signal as shown by waveform 119, and an analog switch circuit 44 for generating the time-adjusted composite synchronizing signal by replacing the composite synchronizing signal from the synchronizing signal separation circuit 18 for the interval from the eleventh to fifteenth horizontal scanning lines H11 to H15.

More specifically, as shown in FIG. 11, the line detection circuit 19 shown in FIG. 9 detects the ninth horizontal line as shown by waveform 114. The timer circuit 41 generates output signals OUT1 to OUT4 as shown by waveforms 115 to 118. The one-H counter 42 generates the quasi-composite signal as shown by waveform 119. The analog switch circuit 44 replaces the composite signal 123 with the quasi-composite synchronizing signal for the eleventh to fifteenth horizontal lines 11H to 15H in response to the output signal OUT5 as shown by waveform 120B to obtained the time-adjusted composite signal as shown by waveform 121B. The VITC signal adding circuit 11 adds the VITC signal to the time-adjusted composite synchronizing signal as shown by waveform 122B. The switching circuit 14 causes the recording current to flow through the magnetic head 16 when the switching timing signal as shown by the waveform 121 is logic H.

FIG. 12 is a block diagram of the line detection circuit 19. The line detection circuit 19 comprises a vertical synchronizing signal detector 45 responsive to the composite synchronizing signal for detecting a vertical synchronizing signal, a horizontal synchronizing detector 46, and a counter 44 for counting the horizontal synchronizing signals after detection of the vertical synchronizing signal to detect a specific horizontal line as shown in FIG. 12.

FIG. 2 shows the waveform of a reproduced video signal from the video tape 15 on which the VITC signal is overwritten by the magnetic recording/reproducing apparatus of the second embodiment also.

FIG. 3 shows an illustration for showing a portion of the magnetic tape 15 to be rewritten through overwriting by the magnetic recording/reproducing apparatus of the second embodiment also.

In this embodiment, the time-adjusted composite signal (waveform 121B) is obtained by replacing the positive composite synchronizing signal (waveform 123) with the quasi-composite synchronizing signal (waveform 119) for the interval indicated by the output signal OUT5 of the timer circuit 41 by the switch circuit 44. However, in this circuit configuration, this replacement is unnecessary. That is, the quasi-composite synchronizing signal can be sent from the time adjust circuit 32 to the VITC signal adding circuit 11 directly.

In the embodiment mentioned above, there is a subject that an FMA (frequency modulation audio) signal recorded on the magnetic tape 15 is erased by the overwriting of the VITC signal to some extent. That is, a signal level of the reproduced video signal decreases with increase in an intensity of the recording current 48 flowing through the magnetic head 16. However, an experiment shows that an amount of erase of the FMA signal is negligible if the recording current is set to be approximately 20 mA pp.

In the embodiments mentioned above, the line detection circuit 19 is used. However, this line detection circuit 19 can be replaced with a timer circuit (not shown) responsive to the vertical synchronizing signal for outputting a timing signal indicative of the timing of the horizontal line where the VITC signal is overwritten. Moreover, in the second embodiment, the recording current 48 is caused to flow through the magnetic head 16 from the middle of the eleventh line 11H to the middle of the sixteenth line 16H as shown by the waveform 121 and the VITC signal is added to the composite synchronizing signal only to the horizontal lines 12H and 15H. However, there are many possible modifications. For example, it is possible that the VITC signal is continuously outputted and the recording current 48 is made to flow only for horizontal lines where the VITC signal should be recorded. Moreover, it is possible that the recording current 48 flows continuously but the VITC signal is generated only for the horizontal line where the VITC signal should be recorded.

In the first embodiment mentioned above, the VITC signal is added to the composite synchronizing signal. However, it is also possible that the VITC signal is added to a horizontal synchronization signal detected from the reproduced video signal.

As mentioned above, the magnetic recording/reproducing apparatus of this invention can record the VITC signal by overwriting the VITC signal on a predetermined portion of a recorded magnetic tape, so that decrease in picture quality during copying of the video signal is prevented.

What is claimed is:

1. A magnetic recording/reproducing apparatus comprising,
   (a) magnetic head means for reproducing a video signal including vertical and horizontal synchronizing signals, recorded on a magnetic tape, in a reproducing mode or writing an information-signal-added horizontal synchronizing signal on said magnetic tape in a recording model;
   (b) synchronizing signal separation means for separating said horizontal synchronizing signal from said reproduced video signal;
   (c) vertical synchronizing signal detection means for detecting said vertical synchronizing signal from said reproduced video signal;
   (d) timing signal generation means responsive to said vertical synchronizing signal for generating a timing signal indicative of a predetermined interval with a predetermined delay from said detected vertical synchronizing signal;
   (e) switching means responsive to said timing signal for switching said mode of said magnetic head means from said reproducing mode to said recording mode; and
   (f) signal generation means responsive to said vertical synchronizing signal, said horizontal synchronizing signal, and a command signal, having:
   delay means;
   information signal generation means for generating an information signal in response to said command signal; and
   signal adding means for adding said information signal to said horizontal synchronizing signal;
   wherein said signal generation means outputs said information-signal-added horizontal synchronizing signal for said predetermined interval using said delay means.

2. A magnetic recording/reproducing apparatus as claimed in claim 1, wherein said delay means delaying said horizontal synchronizing signal from said horizontal synchronizing signal separation means.

3. A magnetic recording/reproducing apparatus as claimed in claim 1, wherein said delay means delaying said horizontal synchronizing signal from said signal adding means.

4. A magnetic recording/reproducing apparatus as claimed in claim 1, wherein said delay time is determined by an interval of said horizontal synchronizing signal and a delay time between said video signal read by said magnetic head means and said signal-added horizontal synchronizing signal written by said magnetic head means.

5. A magnetic recording/reproducing apparatus comprising,
   (a) magnetic head means for reproducing a video signal including vertical and horizontal synchronizing signals, recorded on a magnetic tape, in a reproducing mode or writing an information-signal-added horizontal synchronizing signal on said magnetic tape in a recording mode;

(b) synchronizing signal separation means for separating said horizontal synchronizing signal from said reproduced video signal;

(c) vertical synchronizing signal detection means for detecting said vertical synchronizing signal from said reproduced video signal;

(d) timing signal generation means responsive to said vertical synchronizing signal for generating a timing signal indicative of a predetermined interval with a predetermined delay from said detected vertical synchronizing signal;

(e) switching means responsive to said timing signal for switching said mode of said magnetic head means to said recording mode from said reproducing mode;

(f) quasi-horizontal synchronizing signal generation means responsive to said vertical synchronizing signal for generating a quasi-horizontal synchronizing signal;

(g) information signal generation means responsive to a command signal and said timing signal for generating an information signal; and (h) signal adding means responsive to said timing signal for adding said information signal to said quasi-horizontal synchronizing signal for producing said signal-added horizontal synchronizing signal;

wherein said quasi-horizontal synchronizing signal generation means generates said quasi-horizontal synchronizing signal with lead to said separated horizontal synchronizing signal such that said quasi-horizontal synchronizing signal is recorded in said predetermined interval in phase with said reproduced horizontal synchronizing signal.

6. A magnetic recording/reproducing apparatus comprising, (a) magnetic head means for reproducing a video signal including vertical and horizontal synchronizing signals, recorded on a magnetic tape, in a reproducing mode and for writing an information-signal at a predetermined portion of a pre-recorded recording track on said magnetic tape in a recording mode;

(b) synchronizing signal separation means for separating said horizontal synchronizing signal from said reproduced video signal;

(c) vertical synchronizing signal detection means for detecting said vertical synchronizing signal from said reproduced video signal;

(d) timing signal generation means for generating a timing signal indicative of a predetermined time interval within a vertical blanking interval of a video signal reproduced from the magnetic tape and corresponding to said predetermined portion of a pre-recorded recording track, said timing signal generation means responsive to said vertical synchronizing signal from generating said timing signal to have a predetermined delay from a starting point of the vertical blanking interval;

(e) information signal generating means for generating an information signal to be recorded within said predetermined portion of said pre-recorded recording track;

(e) switching means responsive to said timing signal for switching said mode of said magnetic head means to said recording mode from said reproducing mode during said predetermined time interval within a vertical blanking interval and for switching said mode of said magnetic head means to said reproducing mode during other times; and (f) signal generation means responsive to said vertical synchronizing signal, said horizontal synchronizing signal, and to a command signal, including signal adding means for adding said information signal to said horizontal synchronizing signal and for generating a combined signal;

wherein said signal generation means outputs said combined signal to said switching means and said magnetic head means operates is responsive to said switching means for recording said combined signal only on said predetermined portion of a pre-recorded recording track only during said predetermined interval.

7. A magnetic recording/reproducing apparatus according to claim 6, wherein said information wherein said information signal generating means comprises means for generating a VITC signal for recording in said predetermined portion of a pre-recorded recording track.

* * * * *